(12) United States Patent
Skala et al.

(10) Patent No.: US 6,783,879 B2
(45) Date of Patent: Aug. 31, 2004

(54) DYNAMIC FUEL PROCESSOR MECHANIZATION AND CONTROL

(75) Inventors: Glenn W. Skala, Churchville, NY (US); Gerald Voecks, Fairport, NY (US); William H. Pettit, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 165 days.

(21) Appl. No.: 10/044,335

(22) Filed: Jan. 11, 2002

(65) Prior Publication Data

US 2003/0134166 A1 Jul. 17, 2003

(51) Int. Cl.$^7$ .............................................. H01M 8/04
(52) U.S. Cl. ............................. 429/17; 429/19; 429/22; 429/23; 429/25
(58) Field of Search ............................ 429/17, 19, 20, 429/22, 23, 25

(56) References Cited

U.S. PATENT DOCUMENTS

| | | | |
|---|---|---|---|
| 4,002,805 A | | 1/1977 | Waldman .................. 429/13 |
| 4,642,273 A | * | 2/1987 | Sasaki ..................... 429/25 X |
| 5,334,463 A | | 8/1994 | Tajima et al. ............. 429/9 |
| 5,766,786 A | | 6/1998 | Fleck et al. ............... 429/17 |
| 5,981,096 A | | 11/1999 | Hornburg et al. ......... 429/17 |
| 6,051,192 A | * | 4/2000 | Maston et al. ............ 429/24 X |
| 6,322,917 B1 | * | 11/2001 | Acker ....................... 429/17 |
| 6,569,552 B2 | * | 5/2003 | Kato et al. ................ 429/17 |
| 6,586,125 B2 | * | 7/2003 | Takeda et al. ............ 429/17 |
| 6,593,018 B2 | * | 7/2003 | Ruoff et al. .............. 429/22 |

OTHER PUBLICATIONS

International Search Report dated Apr. 21, 2003; Int'l Appl. No. PCT/US03/00428.

\* cited by examiner

*Primary Examiner*—Stephen J. Kalafut
(74) *Attorney, Agent, or Firm*—Cary W. Brooks, Esq.; Linda M. Deschere, Esq.

(57) ABSTRACT

A fuel processor control system for a fuel cell stack includes water and fuel metering devices that control water and fuel provided to the fuel processor. An air flow rate sensor generates an air flow rate signal based on air flowing from a compressor to the fuel processor. A valve is located between the fuel processor and the fuel cell stack. A controller controls the valve and the water and fuel metering devices based on the air flow rate sensor. Other feedback signals such as stack voltage, stack cell voltage variation, pressure differential across the valve, and mass flow rate between the valve and the fuel cell stack can augment or be substituted for the air flow rate feedback signal. The fuel processor can be a partial oxidation reformer a steam reforming reactor, an auto thermal reformer or any combination thereof. The system may also include a water as shift reactor and a preferential oxidation reactor for carbon monoxide reduction.

52 Claims, 7 Drawing Sheets

DYNAMIC FUEL PROCESSOR MECHANIZATION AND CONTROL

FIELD OF THE INVENTION

The present invention relates to fuel cells, and more particularly to fuel processors for fuel cells.

BACKGROUND OF THE INVENTION

Fuel cells are increasingly being used as a power source in a wide variety of different applications. Fuel cells have been proposed for use in electrical vehicle power plants to replace internal combustion engines. A solid-polymer-electrolyte membrane (PEM) fuel cell includes a membrane that is sandwiched between an anode and a cathode. To produce electricity through an electrochemical reaction, hydrogen ($H_2$) is supplied to the anode and air or oxygen ($O_2$) is supplied to the cathode.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane while the electrons flow through an electrical load that is connected across the electrodes. In a second half-cell reaction, oxygen ($O_2$) at the cathode reacts with protons ($H^+$) and electrons ($e^-$) are taken up to form water ($H_2O$).

The main function of a fuel processor in the fuel cell system is to provide a controlled hydrogen-rich stream to the fuel cell stack. The fuel cell stack converts the chemical energy in the hydrogen to electrical power to charge capacitors or batteries or to directly power a device such as an electric motor. In hybrid applications, a storage medium such as capacitors or batteries removes some of the problems that are associated with transient demand. For non-hybrid applications, the fuel processors need to provide a highly dynamic flow rate of hydrogen-rich gas to the fuel cell stack. When a device is directly powered by the fuel cell, the amount of hydrogen that is required is determined by the demand for power output from the fuel cell. For example in automotive applications, the driver demands power by depressing the accelerator pedal. Acceleration requires the electric motor to turn faster, which requires more current. When the accelerator is depressed, the fuel processor increases the hydrogen that is provided to the fuel cell. The current output by the fuel cell increases and the electric motor accelerates the vehicle.

The fuel processor produces a reformate stream that is composed primarily of hydrogen, carbon dioxide, nitrogen, water, methane and trace amounts of carbon monoxide. During operation, the fuel processor determines the flow rate of hydrogen that is required to meet the current demand for power. As can be appreciated, the demand for power can vary significantly. For example, a vehicle moving in rush hour traffic may repeatedly require sudden acceleration followed by deceleration or braking. Thus, the delivery of hydrogen to the fuel cell stack must vary accordingly. Fuel processors also require careful metering of air and fuel to maintain precise oxygen-carbon ratios in the reformate stream.

While the fuel cell stack can consume as much hydrogen as it needs based on the electrical load applied to the fuel cell stack, mismatching the hydrogen flow and the electrical load is problematic. An under-fueled stack may cause some of the fuel cells to temporarily have reverse polarity, which may damage the fuel cell stack. An over-fueled stack will not damage the fuel cell stack but may increase the combustion temperature. Increased combustion temperature may damage the combustor or cause NOx emissions to increase.

SUMMARY OF THE INVENTION

A fuel processor control system for a fuel cell according to the invention includes a fuel cell stack and a fuel processor. A water metering device controls water provided to the fuel processor. A fuel metering device controls fuel provided to the fuel processor. An air flowrate sensor generates an air flowrate signal based on air flowing to the fuel processor. A valve is located between an outlet of the fuel processor and an inlet of the fuel cell stack. A controller is connected to the water and fuel metering devices, the air flowrate sensor, and the valve. The controller controls the valve and the water and fuel metering devices based on the air flowrate signal.

In other features of the invention, the air flowrate sensor is replaced by other feedback signals. In one alternate embodiment, the fuel cell stack generates a stack voltage signal or a stack cell voltage variation signal. The controller controls the valve and the water and fuel metering devices based on the stack voltage signal or the stack cell voltage variation signal. In another alternate embodiment, a pressure differential sensor is connected to an inlet and an outlet of the valve and generates a pressure differential signal. The controller controls the valve and the water and fuel metering devices based on the pressure differential signal. In another embodiment, a flowrate sensor is connected between the valve and the fuel cell stack. The flowrate sensor provides a stack flowrate signal. The controller controls the valve and the water and fuel metering devices based on the stack flowrate signal.

In still other features of the invention, the fuel processor includes a reformer and a watergas shift reactor that is located between the reformer and the valve. The reformer is preferably an auto thermal reformer or a partial oxidation reformer.

In yet another feature of the invention, the fuel processor includes a steam reforming reactor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
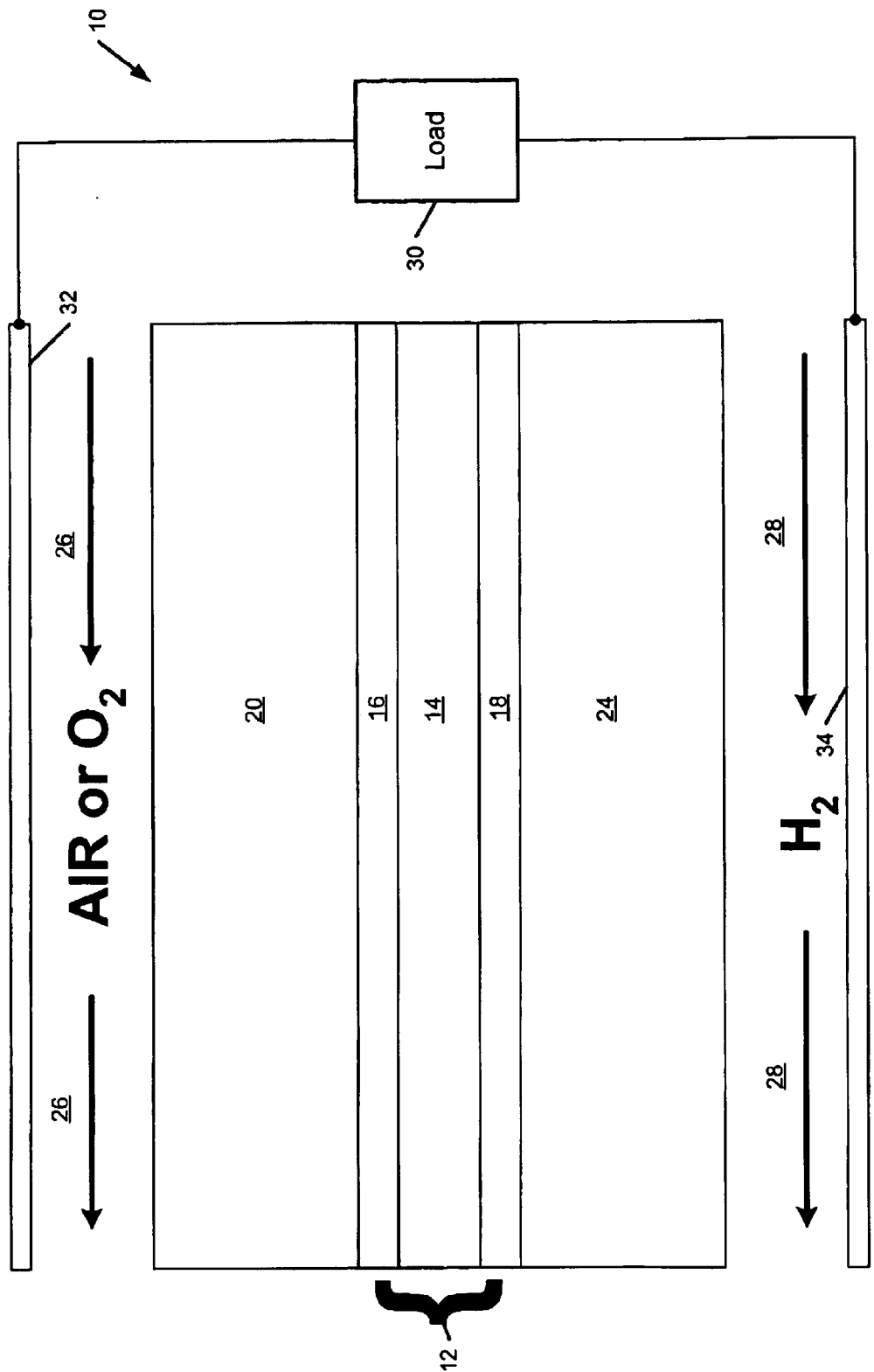
FIG. 1 illustrates a cross-section of a membrane electrode assembly (MEA) of a fuel cell.

Referring now to FIG. 1, a cross-section of a fuel cell assembly 10 that includes a membrane electrode assembly (MEA) 12 is shown. Preferably, the MEA 12 is a proton exchange membrane (PEM). The MEA 12 includes a membrane 14, a cathode 16, and an anode 18. The membrane 14 is sandwiched between the cathode 16 and the anode 18.

A cathode diffusion medium 20 is layered adjacent to the cathode 16 opposite the membrane 14. An anode diffusion medium 24 is layered adjacent to the anode 18 opposite the membrane 14. The fuel cell assembly 10 further includes a cathode flow channel 26 and anode flow channel 28. The cathode flow channel 26 receives and directs air or oxygen ($O_2$) from a source to the cathode diffusion medium 20. The anode flow channel 28 receives and directs hydrogen ($H_2$) from a source to the anode diffusion medium 24.

In the fuel cell assembly 10, the membrane 14 is a cation permeable, proton conductive membrane having $H^+$ ions as the mobile ion. The fuel gas is hydrogen ($H_2$) and the oxidant is oxygen or air ($O_2$). The overall cell reaction is the oxidation of hydrogen to water and the respective reactions at the anode 18 and the cathode 16 are as follows:

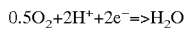

Since hydrogen is used as the fuel gas, the product of the overall cell reaction is water. Typically, the water that is produced is rejected at the cathode 16, which is a porous electrode including an electrocatalyst layer on the oxygen side. The water may be collected as it is formed and carried away from the MEA 12 of the fuel cell assembly 10 in any conventional manner.

The cell reaction produces a proton exchange in a direction from the anode diffusion medium 24 towards the cathode diffusion medium 20. In this manner, the fuel cell assembly 10 produces electricity. An electrical load 30 is electrically connected across a first plate 32 and a second plate 34 of the fuel cell assembly 10 to receive the electricity. The plates 32 and/or 34 are bipolar plates if a fuel cell is located adjacent to the respective plate 32 or 34 or end plates if a fuel cell is not adjacent thereto.

Figure 2A:
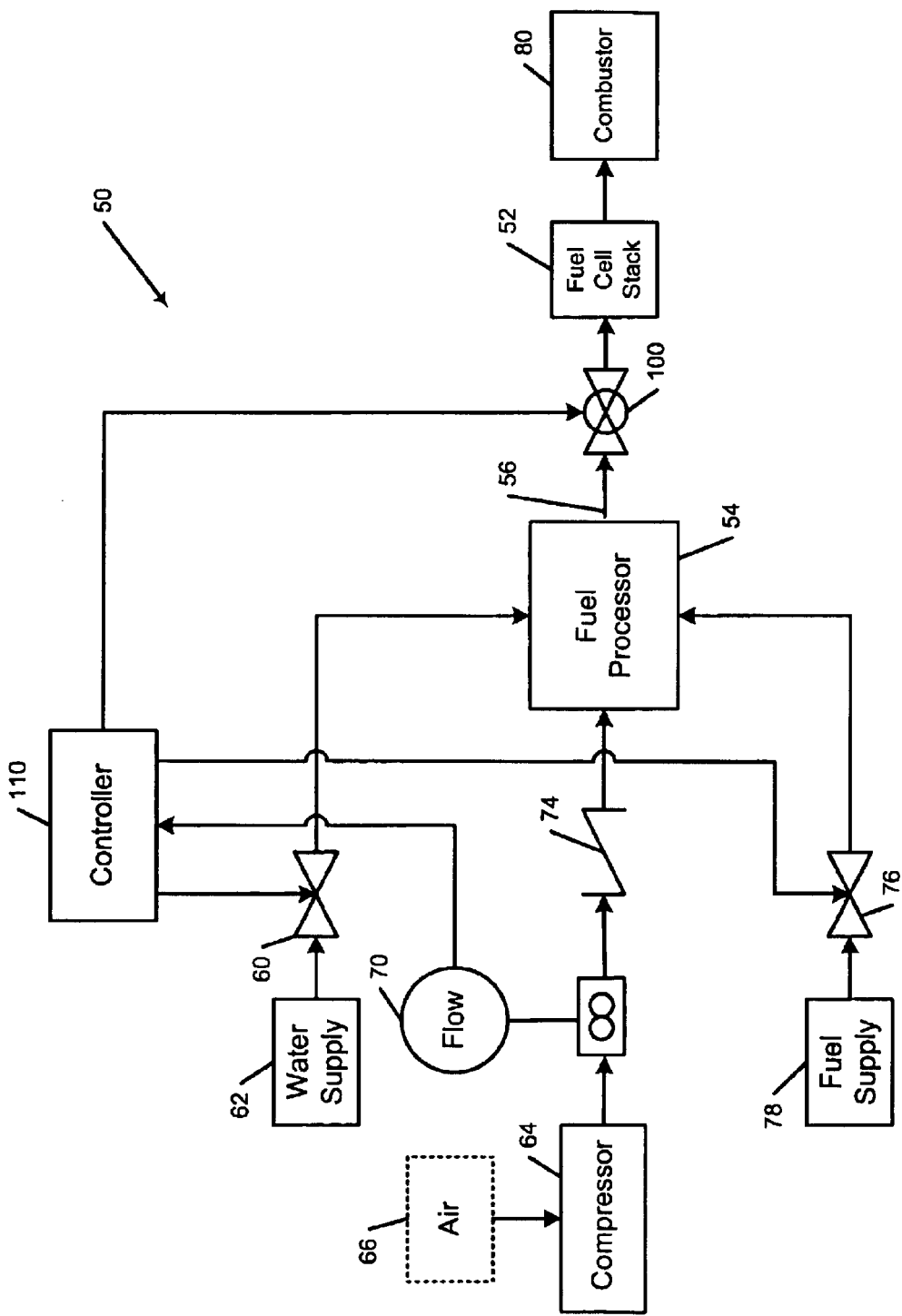
FIG. 2A is a block diagram of a fuel processor control system with a product flow control valve located between the fuel processor and a fuel cell stack that employs airflow from the compressor as a feedback signal.

Referring now to FIG. 2A, a block diagram of a fuel cell system 50 is illustrated. The fuel cell system 50 includes a fuel cell stack 52 that includes multiple fuel cell assemblies 10. A fuel processor 54 provides a reformats stream 56 to the anode flow channel 28. A water metering device 60 controls the supply of water 62 to the fuel processor 54. A compressor 64 controls the supply of air 66 to the fuel processor 54. Since air is generally used as an oxidant in the fuel processor system, a skilled practitioner should recognize that the term air as used herein refers more broadly to any oxidant which supports the various reforming processes mentioned. A flow meter 70 and a check valve 74 are located between the compressor 64 and the fuel processor 54. A fuel metering device 76 controls the supply of fuel 78 to the fuel processor 54. The fuel supply 78 can be methanol, gasoline or other suitable fuels. Outputs of the fuel cell stack 52 are directed to a combustor 80. Outputs of the combustor 80 are emitted as exhaust (not shown).

A product flow control valve 100 is located between the fuel processor 54 and the fuel cell stack 52. An inlet of the product flow control valve 100 is connected to an outlet of the fuel processor 54. An outlet of the product flow control valve 100 is connected to the fuel cell stack 52. The fuel supply 78 and the water supply 62 provide fuel and water to the fuel processor 54. The valve 100 is a conventional reformate control valve (RCV) capable of handling the temperature and pressure of the reformate stream flowing through it.

A controller 110 is connected to the water metering device 60, the flow meter 70 and the fuel metering device 76. The controller 110 is also connected to the product flow control valve 100. The controller 110 reads the flow meter 70 and varies the metering devices 60 and 76 to provide the necessary fuel and water to the fuel processor 54 based on the air flow rate. The controller 110 modulates the product flow control valve 100 to vary the flow of the hydrogen-rich stream to the fuel cell stack 52. By modulating the product flow control valve 100, the controller 110 also controls the back pressure in the fuel processor 54 and hence the flow of air into the fuel processor 54. The downstream throttling of the reformate products provides the necessary hydrogen flow rates that will be required to meet the dynamic demand for power in applications such as automobiles. The fuel processor 54 located upstream from the valve 100 acts like a storage buffer for the products being produced. As the product flow control valve 100 is closed completely or partly, the increasing back pressure in the fuel processor 54 reduces the flow of air through the flow meter 70. At the same time, the speed of the compressor 64 is reduced due to the increased pressure and the compressor 64 supplies less air.

The flow meter 70 senses the reduced airflow and the controller 110 reduces the flow of fuel and/or water to the fuel processor 54 via the metering devices 60 and 76 and the injectors (not shown). If the product flow control valve 100 is closed completely, the compressor 64 quickly reaches maximum pressure and stops providing air. The flow meter 70 registers low or zero air flowrates and the controller 110 cuts off fuel and/or water to the reformer 90.

The present invention employs the internal volume of the fuel processor 54 as a storage buffer. Storage can be facilitated by allowing reactants to continue to flow into the fuel processor after the valve is closed (completely or partly). Pressure builds as the reactants vaporize and react. The stored pressure can be used to provide a nearly immediate flow of the hydrogen-rich gas to the fuel cell stack.

The present invention eliminates multiple feedback control loops that are required by conventional fuel processor controllers and provides a rapidly varying hydrogen flow rate in response to changes in the demand for power. The time delays produced in conventional systems with multiple control loops significantly adds to the transient response time of the conventional fuel cell systems. In addition, the possible interactions between the separate control loops of conventional systems can create instability and control errors that impact the accuracy of the oxygen-carbon (O/C) ratio or steam-carbon (S/C) ratios. The present invention also adds robustness to the control of the fuel processor. Without the valve 100, the fuel processor 54 will have a flow response that is proportional to its internal volume. With the valve 100 located as close as possible to the fuel cell stack, the flow response is almost instantaneous.

Figure 2D:
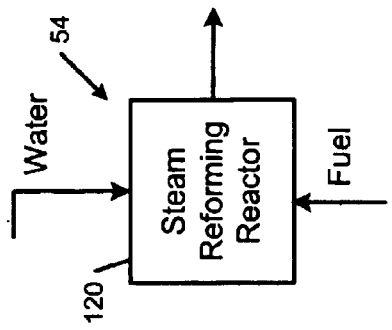
FIG. 2D is a block diagram of a third fuel processor including a steam reforming reactor.
Figure 2B:
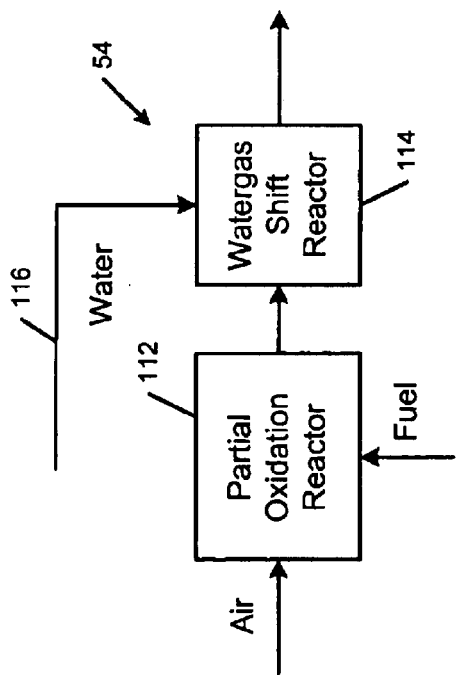
FIG. 2B is a block diagram of a first fuel processor that includes a partial oxidation reformer and a watergas shift reactor.
Figure 2C:
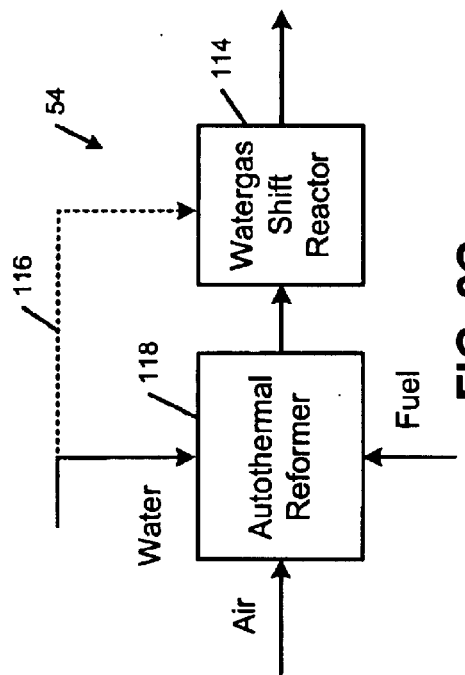
FIG. 2C is a block diagram of a second fuel processor that includes an auto thermal reformer and a watergas shift reactor.

Referring now to FIGS. 2B, 2C, and 2D, various exemplary fuel processors 54 are illustrated. In FIG. 2B, the fuel processor 54 includes a partial oxidation 112 and a watergas shift reactor 114. Water is provided to the watergas shift reactor as is illustrated by lines 116. In FIG. 2C, the fuel processor 54 includes an auto thermal reformer 118 and the watergas shift reactor 114. Water can be optionally provided to the watergas shift reactor 114 as is shown by the dotted line 116. In FIG. 2D, the fuel processor 54 includes a steam reforming reactor 120.

Figure 3:
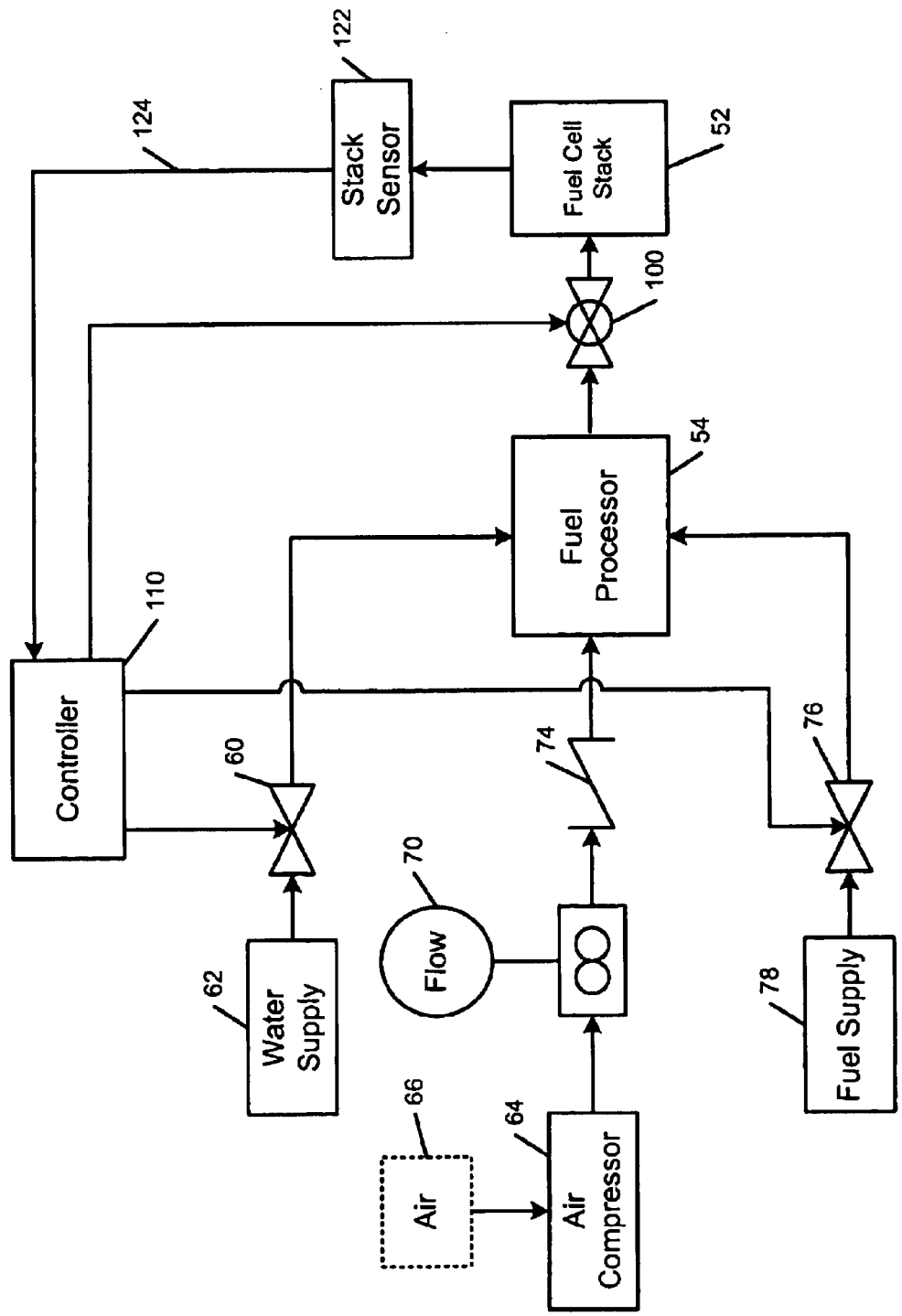
FIG. 3 is a schematic block diagram of a fuel processor control system similar to that shown is FIGS. 2A, 2B, 2C and 2D that employs stack voltage or stack cell voltage variation as a feedback signal.

Referring now to FIG. 3, a first alternate feedback signal may be used by the controller 110 to vary the delivery of hydrogen. Reference numerals from FIG. 2 have been used in FIG. 3 to identify the same elements. The system illustrated in FIG. 3 employs a stack sensor 122 that generates a feedback signal 124 that is proportional to the stack voltage or the stack cell voltage variation. Both the stack voltage and the stack cell voltage variation indicate the partial pressure of hydrogen and oxygen in the fuel cell stack 52. The controller 110 employs the stack voltage or the stack cell voltage variation to control the metering devices 60 and 76 and to vary the opening of the product flow control valve 100.

Figure 4:
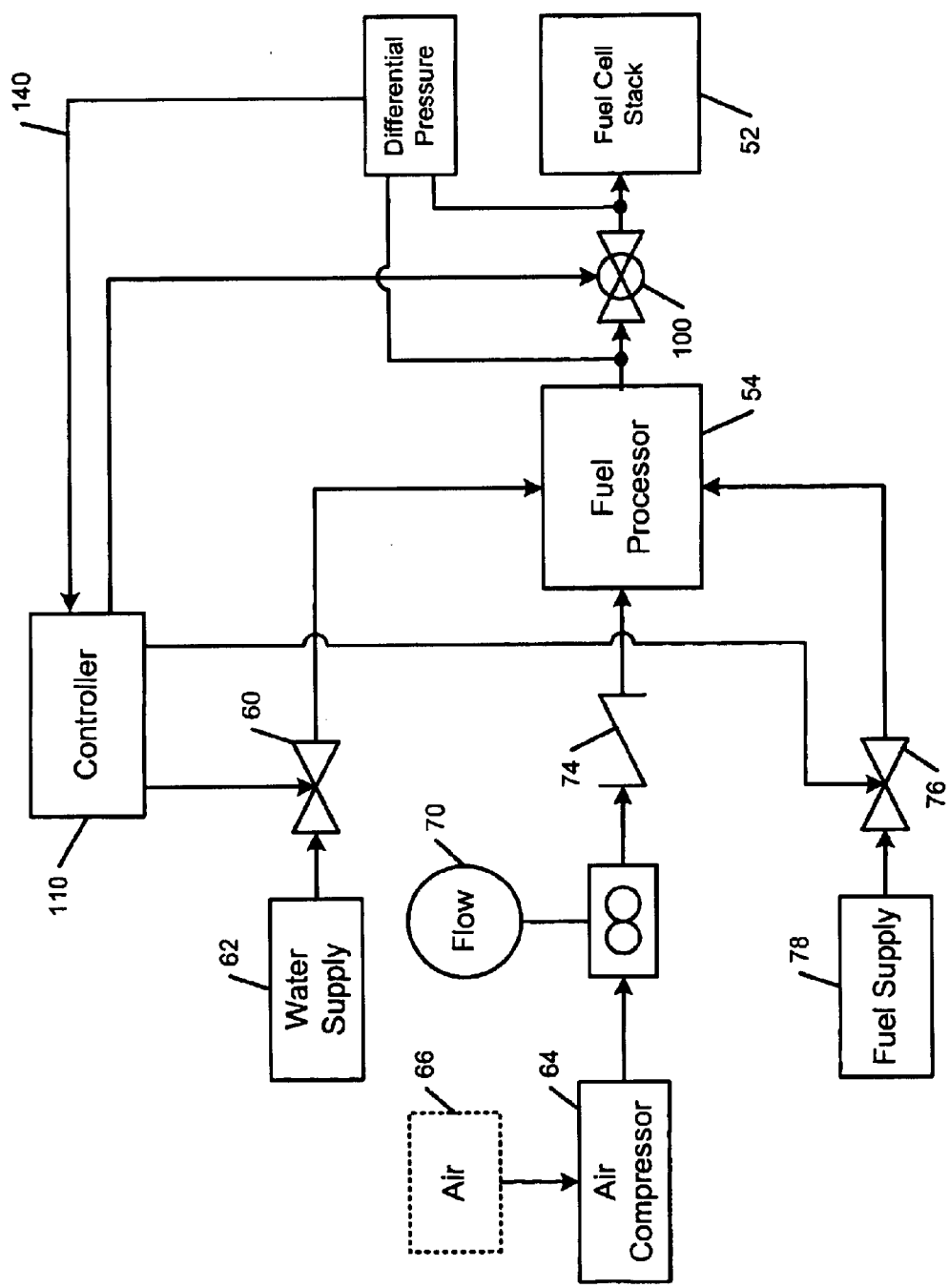
FIG. 4 is a schematic block diagram of a fuel processor controller similar to that shown in FIGS. 2A, 2B, and 2C and 2D that employs a pressure differential as a feedback signal.

Referring now to FIG. 4, a second alternate feedback signal may be used by the controller 110 to vary the delivery of hydrogen. For purposes of clarity, reference numerals from FIG. 2 have been used to identify the same elements. The system illustrated in FIG. 4 employs feedback signals 140 that relate to an inlet pressure and pressure differential between input and output ends of the product flow control valve 100. The feedback signals 140 indicate the mass flow rate of reformate through the valve. The controller 110 employs the feedback signals to control the water and fuel metering devices 60 and 76 and the product flow control valve 100.

Figure 5:
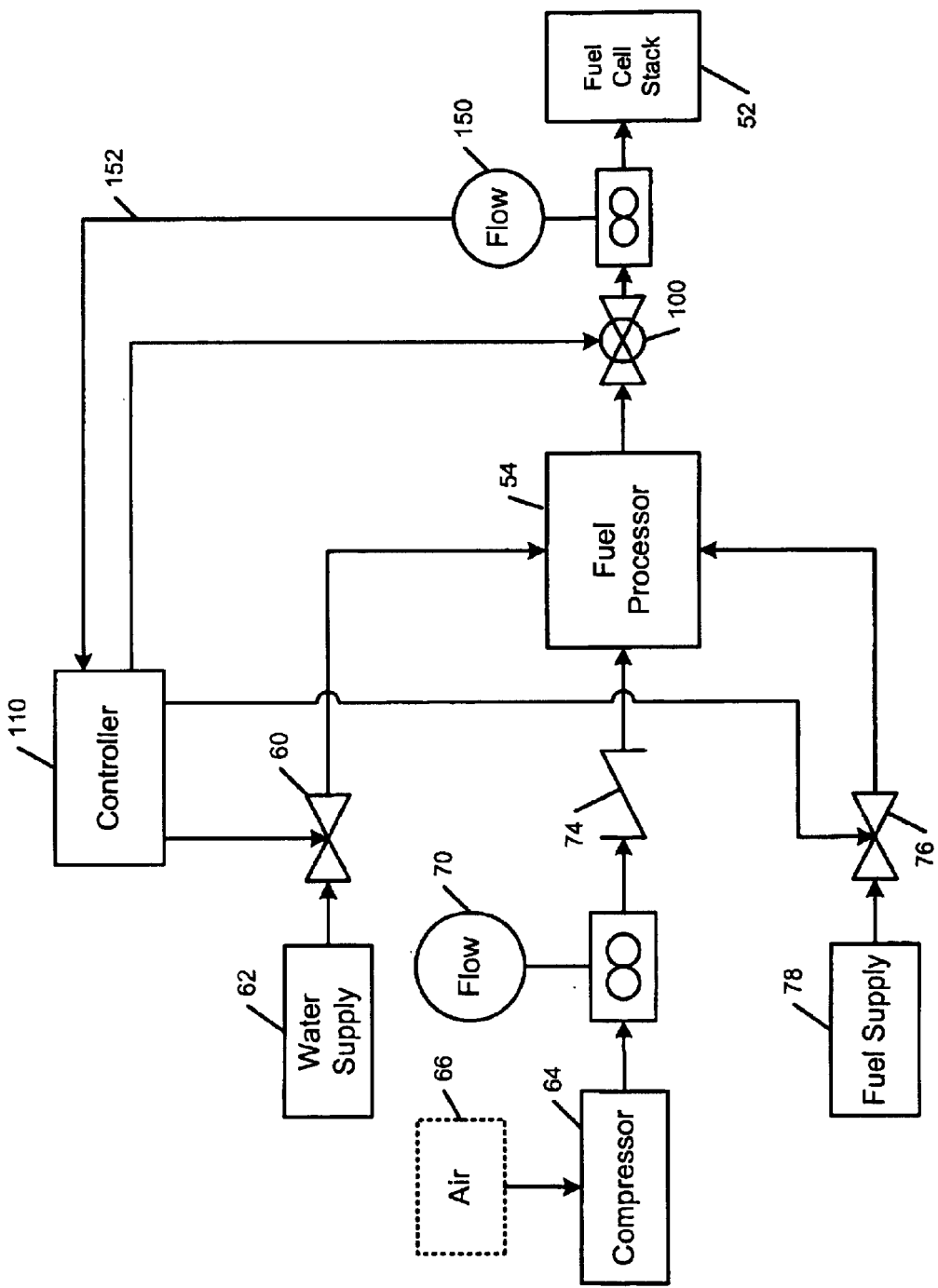
FIG. 5 is a schematic block diagram of a fuel processor controller similar to that shown in FIGS. 2A, 2B, 2C and 2D that employs a flow meter that is located between the product flow control valve and the fuel cell stack.

Referring now to FIG. 5, a third alternate feedback signal may be employed by the controller 110 to vary the delivery of hydrogen. Reference numerals from FIG. 2 have been used to identify the same elements. A flow meter 150 provides a feedback signal 152 that is proportional to gas flowrates between the product flow control valve 100 and the fuel cell stack 52. The flowrate feedback signal 152 indicates the mass flow of reformate into the fuel cell stack. The controller 110 employs the flow rate feedback signal 152 to control the water and fuel metering devices 60 and 76 and the product flow control valve 100 to provide the correct amount of hydrogen to the fuel cell stack 52 based on demand for power.

Various feedback control schemes have been disclosed above in an independent manner. However, a skilled practitioner will readily recognize that any or all of these feedback control schemes could be combined to provide an optimized feedback control of the control valve 100.

Figure 6:
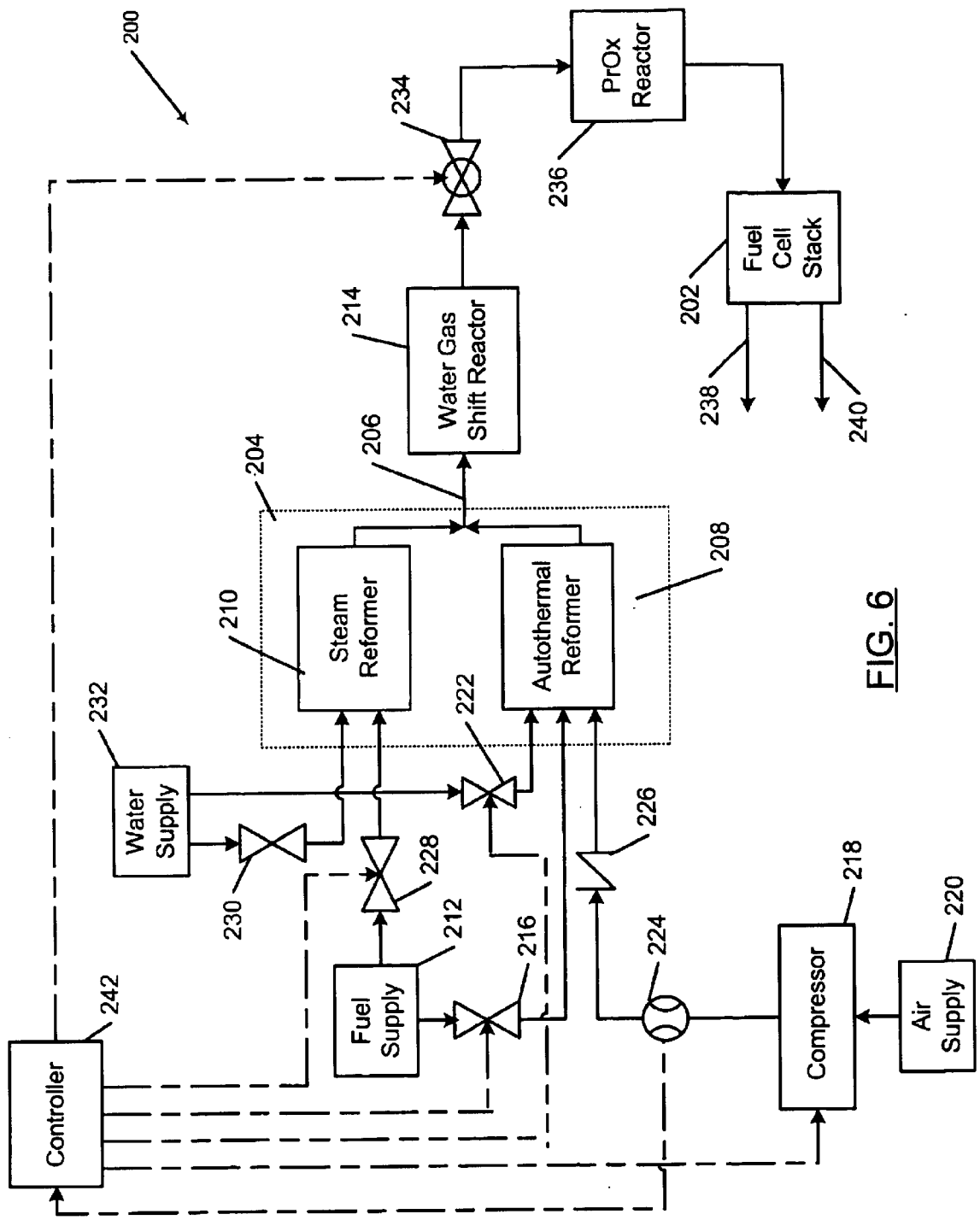
FIG. 6 is a schematic block diagram of a fuel processor similar to that shown in FIGS. 2A, 2B, 2C, and 2D that employs two reactors in parallel within the primary reactor, a shift reactor, a control valve, followed by a preferential oxidation (PrOx) reactor before introduction into the fuel cell stack.

Referring now to FIG. 6, a block diagram of an alternate fuel cell system 200 is illustrated. The fuel cell system 200 includes a fuel cell stack 202 having multiple fuel cell assemblies 10. A primary reactor 204 to break down the hydrocarbon fuel to provide a reformate stream 206. As illustrated, the primary reactor 204 includes an auto thermal reformer 208 and a steam reformer 210 coupled in parallel between a fuel supply 212 and a water gas shift reactor 214. Alternately, the primary reactor 204 could be arranged in series. A fuel metering device 216 controls the supply of fuel 212 to autothermal reformer 208. A water metering device 222 controls the supply of water 232 to auto thermal reformer 208. A variable speed compressor 218 controls the supply of pressurized air 220 to auto thermal reformer 208. The illustrated embodiment shows a compressor generally associated with the fuel processor. A skilled practitioner will recognize that the compressor may be dedicated to the fuel processing system or associated with the cathode air supply to the fuel cell stack. A mass flow meter 224 and a check valve 226 are located between the compressor 218 and the auto thermal reformer 208 to further control air flow to the auto thermal reformer 208. A fuel metering device 228 controls the supply of fuel 212 to the steam reformer 210. Likewise, a water metering device 230 controls the supply of water 232 to the steam reformer 210.

A product flow control valve 234 is located between water gas shift reactor 214 and preferential oxidation (PrOx) reactor 236. Specifically, an inlet of the control valve 234 is connected an outlet of the water gas shift reactor 214. The outlet of the control valve 234 is connected to the PrOx reactor 236. Effluent from PrOx reactor 236 provides a reformate stream to the anode flow channel 28 of fuel cell stack 202. Anode exhaust 238 and cathode exhaust 240 are discharged from the fuel cell stack 202 and are available for thermal energy management in the fuel cell system 200. For example, a combustor may be utilized to generate additional thermal energy for use by the primary reactor 204.

A controller 242 is connected to fuel metering devices 216, 228, water metering device 222, 230 and control valve 234. The controller 242 receives a control signal from the mass flow meter 224 and varies the metering device 216, compressor 218, and metering devices 222, 228 and 230 to provide the necessary quantities of fuel and water to the primary reactor 204 based on the mass flow rate of air, and state of the primary reactor 204 operation i.e., pure auto thermal reforming, pure steam reforming or a combination of auto thermal and steam reforming. The controller 242 also modulates the control valve 234 to vary the flow of reformate downstream of the water gas shift reactor 214. By modulating the control valve 234, the controller 242 also varies the pressure in the auto thermal reformer 208.

While feedback control via controller 242 is based on a feedback signal from meter 224, a skilled practitioner will readily recognize that other feedback signals, such as stack voltage and stack voltage variation, inlet pressure and pressure variation across the control valve or the mass flow rate of reformate to the fuel cell stack, could be combined to provide an optimized feedback control of the control valve 234.

This mechanization allows for partial oxidation or auto thermal reforming within the auto thermal reformer during startup, with transition to pure high pressure steam reforming during run if desired, and the potential for transient supplement of the auto thermal reforming if the steam reformer pressure is evacuated due to response time, duration, or steam reforming thermal balance. This aspect of the present invention will be more fully appreciated with a description of the operating process. Upon startup, control valve 234 is open to minimize parasitic load on the compressor 218. Air is provided from air supply 220 to the auto thermal reformer 208 via the air compressor 218, mass flow meter 224 and check valve 226. Fuel from fuel supply 212 is introduced to the auto thermal reformer 208 through fuel metering device 216. Water if available from water supply 232 is introduced to auto thermal reformer 208 through water metering device 222. If water is not available during start-up, auto thermal reformer 208 will act as a partial oxidation reactor during the period where water is not available. During start-up, the excess hydrogen and carbon monoxide may be used to fire a burner to heat steam reformer 210. Once the auto thermal reformer 208, water gas shift reactor 214, and PrOx reactor 236 are up to operational temperature the process is initiated. The controller 242 modulates control valve 234 to supply the required reformate to PrOx 236 and fuel cell stack 202. The steam reformer if not heated as previously described would be heated using for example a burner fueled via anode exhaust 238 and cathode exhaust gas 240. Addition fuel and air may be supplied to the steam reformer 210 combustion heating if required.

Upon steam reformer 210 being at operational temperature, controller 242 would command valves 230 and 228 to supply water and fuel via supplies 232 and 212 to steam reformer 210 at an appropriate steam to carbon (S/C) ratio and flow rate according to the known heat energy available. The flow rate of fuel supplied through flow controller 228 and water supplied through flow controller 230 would be controlled for example via temperature control feedback within the steam reformer 210. As the steam reformer comes on line, it would utilize all thermal energy available to operate at a flow command greater than that required by the fuel cell stack 202.

As the reformate generated from the primary reactor 204 and water gas shift 214 exceeds the requirement of the fuel cell stack 202, controller 242 would control the flow of reformate via control valve 234. If the reformate generated via the primary reactor 204 and water gas shift reactor 214 exceeds the reformate needed by the fuel cell stack 202, pressure would build upstream of valve 234. As the pressure builds within the auto thermal reformer, capability of the compressor 218 would be limited resulting in reduced air flow. As the pressure builds and the compressor 218 flow capability is reduced, controller 242 would monitor a control signal from mass flow controller 224 and adjust the fuel flow 216 and water flow 222 in order to maintain the desired O/C ratio and S/C ratio. Upon the pressure exceeding capability of the compressor 218, the air flow to auto thermal reformer 208 would stop. In parallel, fuel flow via flow controller 216 and water flow via flow controller 222 would be terminated. The pressure within the primary reactor would now build to the designed normal operating pressure limit. Once such a limit is reached controller 242 would continue to supply stack reformate at a desired flow rate via control valve 234 and would continue to control fuel flow via control valve 228 and water flow via control valve 230 to maintain the desired pressure within steam reformer 210. Controller 242 would use reformer feedback, for example temperature, to also control fuel and water flow.

During power transients (e.g., minimum to maximum power transients with power remaining at maximum power) the energy requirements of the steam reformer 210 may be too great for a system thermal balance or the thermal response time. The steam reformer during such transients would increase the fuel flow via control valve 228 and the water flow via valve 230 to support the transient until the steam reformer 210 internal control feedback, for example temperature feedback, required the fuel and water flow to not follow the increased reformate demand. Thus, during such transients, the controller 242 modulates the control valve 234 and allows the back pressure in the auto thermal reformer 208 to decay to support quick hydrogen delivery when heat transfer lags. As the pressure within the primary reactor 204 drops below the compressor pressure threshold, the compressor 218 would begin to supply air to auto thermal reformer 208. Controller 242 would use air mass flow sensor 224 to determine the air flow and command the fuel flow via controller 216 and water flow via flow controller 222 in parallel to the air flow to maintain the desired O/C ratio and S/C ratio. The air compressor 218 used for the auto thermal reformer could be a system cathode feed compressor with one port feeding the auto thermal reformer 208 during start-up and dynamic conditions. The percentage of reformate supplied via the auto thermal reformer 208 and steam reformer 210 would depend on the power demand increase, duration, and the heat integration of the integrated fuel cell system 200. Once the refomate demand via the fuel cell stack 202 is less than the reformate generating capability of the steam reformer 210 and auto thermal reformer 208 controller 242 would use control valve 234 to maintain the desired reformate flow to the stack 202 and begin to build pressure within the primary reactor 204 and water gas shift 214. Upon pressure exceeding capability of the compressor 218 the air flow via compressor 218, fuel flow via control valve 216, and water flow via control valve 222 would be terminated until the next power transient or inadequate thermal balance supporting the steam reformer 210.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A fuel processing system for a fuel cell comprising:
   a fuel processor having an inlet receiving at least one input stream and an outlet discharging a reformate containing hydrogen, said fuel processor operable to form said reformate;
   said input stream having a control device to selectively input said input stream to said fuel processor;
   a valve in fluid communication with said outlet; and
   a controller modulating said valve to control a flow rate of said reformate discharged from said fuel processor, which cooperates with said control device to provide an increasing back-pressure in said fuel processor when said valve is at least partially closed whereby said fuel processor acts as a storage buffer, and
   wherein said fuel processor includes a partial oxidation reformer and a water gas shift reactor located between said partial oxidation reformer and said valve.

2. The fuel processing system of claim 1 further comprising a water metering device providing fluid communication between a water supply and a water inlet of said fuel processor to selective input said water to said fuel processor.

3. The fuel processing system of claim 2 wherein said fuel processor is a steam reforming reactor.

4. The fuel processing system of claim 2 said fuel processor includes an auto thermal reformer and a water gas shift reactor located between said auto thermal reformer and said valve.

5. The fuel processing system of claim 2 wherein said fuel processor includes an auto thermal reformer and a steam reforming reactor.

6. The fuel processing system of claim 5 wherein said auto thermal reformer and said steam reforming reactor are coupled in parallel between said inlet and said valve.

7. The fuel processing system of claim 1 further comprising a pressure differential sensor connected to an inlet and an outlet of said valve for generating a control signal based on a pressure differential across said valve, said controller using said control signal to modulate said valve.

8. A fuel processing system for a fuel cell comprising:
   a fuel processor having a fuel inlet receiving a fuel and an outlet discharging a reformate containing hydrogen, said fuel processor operable to break down said fuel to form said reformate;
   a fuel metering device providing fluid communication between a fuel supply and said fuel inlet to selectively input said fuel to said fuel processor;
   a valve in fluid communication with said outlet;
   a controller modulating said valve to control a flow rate of said reformate discharged from said fuel processor; and
   a flow rate sensor in fluid communication with an air inlet of said fuel processor for generating a control signal as a function of a flow rate of said air provided to said fuel processor, said controller using said control signal to modulate said valve.

9. The fuel processing system of claim 8 further comprising an air compressor in fluid communication with said air inlet, said controller using said control signal to modulate said compressor.

10. A fuel processing system for a fuel cell comprising:
    a fuel processor having an inlet receiving at least one input stream and an outlet discharging a reformate containing hydrogen, said fuel processor operable to form said reformate;
    said input stream having a control device to selectively input said input stream to said fuel processor;
    a valve in fluid communication with said outlet;
    a controller modulating said valve to control a flow rate of said reformate discharged from said fuel processor, which cooperates with said control device to provide an increasing back-pressure in said fuel processor when said valve is at least partially closed whereby said fuel processor acts as a storage buffer;
    a fuel cell stack having an anode inlet in fluid communication with said valve, said fuel cell stack operable to generate electrical energy and an anode exhaust from said reformate; and
    a stack sensor for generating a control signal based on at least one of a stack voltage signal and a stack cell voltage variation signal, said controller using said control signal to modulate said valve.

11. A control system for a fuel processor of a fuel cell stack, comprising:
    a water metering device that controls water provided to said fuel processor;
    a fuel metering device that controls fuel provided to said fuel processor;
    an air flow rate sensor that generates an air flow rate signal based on air flowing to said fuel processor;
    a valve located between said fuel processor and said fuel cell stack; and
    a controller that controls said valve, said water metering device and said fuel metering device based on said air flow rate signal.

12. The control system of claim 11 wherein said fuel processor includes a steam reforming reactor.

13. The control system of claim 11 wherein said fuel processor includes a partial oxidation reformer and a water gas shift reactor located between said partial oxidation reformer and said valve.

14. The control system of claim 11 wherein said fuel processor includes an auto thermal reformer and a water gas shift reactor located between said auto thermal reformer and said valve.

15. The control system of claim 11 wherein said fuel processor includes an auto thermal reformer and a steam reforming reactor.

16. The control system of claim 15 wherein said auto thermal reformer and said steam reforming reactor are coupled in parallel between a fuel supply and a water gas shift reactor.

17. The control system of claim 11 wherein said fuel processor acts as a storage buffer when said valve is partially or completely closed.

18. A fuel processing system for a fuel cell stack, comprising:
    a water metering device that controls water provided to said fuel processor;
    a fuel metering device that controls fuel provided to said fuel processor;
    a stack sensor that generates one of a stack voltage signal and a stack cell voltage variation signal;
    a valve located between said fuel processor and said fuel cell stack; and
    a controller that controls said valve, said water metering device and said fuel metering device based on said one of said stack voltage signal and said stack cell voltage variation signal.

19. The system of claim 18 wherein said fuel processor is a steam reforming reactor.

20. The system of claim 18 wherein said fuel processor includes a partial oxidation reformer and a water gas shift reactor located between said partial oxidation reformer and said valve.

21. The system of claim 18 said fuel processor includes an auto thermal reformer and a water gas shift reactor located between said auto thermal reformer and said valve.

22. The system of claim 18 wherein said fuel processor acts as a storage buffer when said valve is partially or completely closed.

23. A fuel processing system for a fuel cell stack, comprising:
    a water metering device that controls water provided to said fuel processor;
    a fuel metering device that controls fuel provided to said fuel processor;
    a valve located between said fuel processor and said fuel cell stack;
    a pressure differential sensor connected to an inlet and an outlet of said valve that generates a pressure differential signal; and
    a controller that controls said valve, said water metering device and said fuel metering device based said pressure differential signal.

24. The system of claim 23 wherein said fuel processor is a steam reforming reactor.

25. The system of claim 23 wherein said fuel processor includes a partial oxidation reformer and a water gas shift reactor located between said partial oxidation reformer and said valve.

26. The system of claim 23 said fuel processor includes an auto thermal reformer and a water gas shift reactor located between said auto thermal reformer and said valve.

27. The system of claim 23 wherein said fuel processor acts as a storage buffer when said valve is partially or completely closed.

28. A fuel processing system for a fuel cell stack, comprising:
   a water metering device that controls water provided to said fuel processor;
   a fuel metering device that controls fuel provided to said fuel processor;
   a valve located between said fuel processor and said fuel cell stack;
   a flow rate sensor connected between said valve and said fuel cell stack for providing a stack flow rate signal; and
   a controller that controls said valve, said water metering device and said fuel metering device based said stack flow rate signal.

29. The system of claim 28 wherein said fuel processor is a steam reforming reactor.

30. The system of claim 28 wherein said fuel processor includes a partial oxidation reformer and a water gas shift reactor located between said partial oxidation reformer and said valve.

31. The system of claim 28 said fuel processor includes an auto thermal reformer and a water gas shift reactor located between said auto thermal reformer and said valve.

32. The system of claim 28 wherein said fuel processor acts as a storage buffer when said valve is partially or completely closed.

33. A method of controlling a fuel processor for a fuel cell stack, comprising:
   providing a fuel cell stack and a fuel processor;
   metering water provided to said fuel processor;
   metering fuel provided to said fuel processor;
   sensing a flow rate of air to said fuel processor;
   providing a valve between said fuel processor and said fuel cell stack; and
   controlling said valve, said water metering device and said fuel metering device based on said air flow rate.

34. The method of claim 33 wherein said fuel processor includes an auto thermal reformer and a water gas shift reactor.

35. The method of claim 33 wherein said fuel processor includes a partial oxidation reformer and a water gas shift reactor.

36. The method of claim 33 wherein said fuel processor includes a steam reforming reactor.

37. The method of claim 33 wherein said fuel processor acts as a storage buffer when said valve is partially or completely closed.

38. A method of controlling a fuel processor for a fuel cell stack, comprising:
   providing a fuel cell stack and a fuel processor;
   metering water provided to said fuel processor;
   metering fuel provided to said fuel processor;
   sensing at least one of stack voltage and stack cell voltage variation;
   providing a valve between said fuel processor and said fuel cell stack; and
   controlling said valve, said water metering device and said fuel metering device based on said at least one of said stack voltage and said stack cell voltage variation.

39. The method of claim 38 wherein said fuel processor includes an auto thermal reformer and a water gas shift reactor.

40. The method of claim 38 wherein said fuel processor includes a partial oxidation reformer and a water gas shift reactor.

41. The method of claim 38 wherein said fuel processor includes a steam reforming reactor.

42. The method of claim 38 wherein said fuel processor acts as a storage buffer when said valve is partially or completely closed.

43. A method of controlling a fuel processor for a fuel cell stack, comprising:
   providing a fuel cell stack and a fuel processor;
   metering water provided to said fuel processor;
   metering fuel provided to said fuel processor;
   providing a valve between said fuel processor and said fuel cell stack;
   monitoring a pressure differential between an inlet and an outlet of said valve; and
   controlling said valve, said water metering device and said fuel metering device based on said pressure differential.

44. The method of claim 43 wherein said fuel processor includes an auto thermal reformer and a water gas shift reactor.

45. The method of claim 43 wherein said fuel processor includes a partial oxidation reformer and a water gas shift reactor.

46. The method of claim 43 wherein said fuel processor includes a steam reforming reactor.

47. The method of claim 43 wherein said fuel processor acts as a storage buffer when said valve is partially or completely closed.

48. A method of controlling a fuel processor for a fuel cell stack, comprising:
   providing a fuel cell stack and a fuel processor;
   metering water provided to said fuel processor;
   metering fuel provided to said fuel processor;
   providing a valve between said fuel processor and said fuel cell stack;
   monitoring gas flow rate between an outlet of said valve and said fuel cell stack; and
   controlling said valve, said water metering device and said fuel metering device based on said gas flow rate.

49. The method of claim 48 wherein said fuel processor includes an auto thermal reformer and a water gas shift reactor.

50. The method of claim 48 wherein said fuel processor includes a partial oxidation reformer and a water gas shift reactor.

51. The method of claim 48 wherein said fuel processor includes a steam reforming reactor.

52. The method of claim 48 wherein said fuel processor acts as a storage buffer when said valve is partially or completely closed.

* * * * *